(12) United States Patent
Nelson

(10) Patent No.: US 7,742,434 B2
(45) Date of Patent: Jun. 22, 2010

(54) ETHERNET CHAINING METHOD

(75) Inventor: Matthew Allen Nelson, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 687 days.

(21) Appl. No.: 11/515,025

(22) Filed: Sep. 5, 2006

(65) Prior Publication Data

US 2008/0056158 A1 Mar. 6, 2008

(51) Int. Cl.
*H04L 12/28* (2006.01)
(52) U.S. Cl. .................................... 370/254; 370/351
(58) Field of Classification Search ................. 370/254, 370/216, 217
See application file for complete search history.

(56) References Cited

U.S. PATENT DOCUMENTS

| | | | |
|---|---|---|---|
| 6,036,897 A * | 3/2000 | Nugent ....................... 264/40.6 |
| 6,295,510 B1 * | 9/2001 | Discenzo ..................... 702/183 |
| 6,950,441 B1 * | 9/2005 | Kaczmarczyk et al. ...... 370/467 |
| 2005/0259571 A1 * | 11/2005 | Battou ......................... 370/217 |
| 2006/0250947 A1 * | 11/2006 | Allen .......................... 370/216 |
| 2007/0025240 A1 * | 2/2007 | Snide .......................... 370/217 |
| 2007/0297443 A1 * | 12/2007 | Bowers et al. .............. 370/463 |

\* cited by examiner

*Primary Examiner*—Dang T Ton
*Assistant Examiner*—Frederick Ott
(74) *Attorney, Agent, or Firm*—Nixon & Vanderhye P.C.

(57) ABSTRACT

A method for interconnecting modules using a local area network daisy chained architecture is disclosed. The architecture includes point-to-point connections between the module and the two modules preceding and/or the two modules following such module in the chain. This architecture allows the chain to be extended and for modules to be removed from the chain without interrupting service to the other modules. A microprocessor and additional Ethernet port provide an additional gateway for connection to an external device.

20 Claims, 2 Drawing Sheets

ETHERNET CHAINING METHOD

The present invention is directed to a scalable, daisy chained Ethernet network and method that allows modules with point-to-point connections between them to be removed from the chain and replaced (one at a time) without affecting the operation of the chain. The chain can scale from just a few modules to a large number as required.

BACKGROUND OF THE INVENTION

A monitoring/control/data-acquisition system should be expandable according to the number of points needed, so as to require just a few modules or many modules. In addition, a system design that allows modules to be concentrated into a single location (such as a rack) or be distributed near the point of use reduces wiring costs. Failures in one module should not affect the operation of other modules and modules should be able to be swapped out without affecting other modules. High speed communication between modules is required. In this regard, serial communication keeps pin counts low and bandwidths high, but high speed serial links (such as Ethernet) are typically point to point and require a bridge or switch circuit. This switch circuit becomes a single point failure source that can take the entire system out of operation In existing monitoring/control system designs, the single point failure issue has been solved using redundant networks. In the case of standard PICMG 2.16, two separate switch cards (referred to as "fabric cards") are installed into the rack holding monitoring/control cards, providing separate Ethernet links to each card. However, there are difficulties to with this approach. First, a switch card must have enough ports on it to service the full rack. For a small number of cards, the user must still purchase the two switch cards, thereby greatly increasing the buy-in cost of the rack. Second, the size of the rack is limited to the number of channels supported on the switch cards.

Other designs have solved the problem using a loop architecture in which the end module of the chain loops back to the first. This architecture requires identification of the last module in the chain and a long wiring run from the last module to the first.

BRIEF DESCRIPTION OF THE INVENTION

In an exemplary embodiment of the invention, a local area network comprises a plurality of modules, each module having at least two of the plurality of modules preceding said module in the network and/or at least two of the plurality of modules following said module in the network, a plurality of links extending between the plurality of modules, each point-to-point link extending between two modules so as to connect the plurality of modules in daisy chain fashion, each of the plurality of modules being connected by a point-to-point link to each of the two modules preceding said module and/or to each of the two modules following said module, whereby the daisy chain of modules can be extended and/or each of the plurality of modules can be removed one at a time from the network and replaced without affecting the operation of the network.

In another exemplary embodiment of the invention, an Ethernet comprises a plurality of monitors connected together in daisy chain fashion, each monitor having at least two monitors preceding said monitor in the Ethernet and/or at least two monitors following said monitor in the Ethernet, a plurality of point-to-point links extending between the plurality of monitors so as to connect said plurality of monitors in said daisy chain fashion, each point-to-point link extending between two of the plurality of monitors, each of the plurality of monitors being connected by a point-to-point link to each of the two monitors preceding said monitor in the Ethernet and/or to each of the two monitors following said monitor in the Ethernet, whereby the daisy chain of monitors can be extended and/or each of the plurality of monitors can be removed one at a time from the Ethernet and replaced without affecting the operation of the Ethernet.

In yet another exemplary embodiment of the invention, a method of interconnecting monitor modules to form a local area network, which comprises a plurality of monitor modules and a plurality of point-to-point links extending between the plurality of monitor modules so as to interconnect the monitor modules in a daisy chain fashion, comprises the steps of connecting each of the plurality of monitor modules through point-to-point links to each of the two monitor modules preceding said monitor module in the daisy chain network, and/or connecting each of the plurality of monitor modules through point-to-point links between each of the two monitor modules following said module in the daisy chain network.

The present invention is directed to a daisy chained local area network, such as an Ethernet, and to a method for interconnecting modules using a daisy chained local area network architecture, such as an Ethernet. The architecture includes point-to-point connections between each module and the two modules in the chain preceding and following such module. This architecture allows the chain to be extended, and for modules to be removed from the chain without interrupting service to the other modules. A module can be, by way of example, a monitoring device for rotating machines, a control device for rotating machines, and/or a data acquisition device for rotating machines. A module can also be, by way of further example, a computer, a monitor and/or a terminal. A microprocessor and additional port provide an additional gateway for connection to an external device.

DETAILED DESCRIPTION OF THE INVENTION

A local area network or "LAN" is a data communications network that is geographically limited. Typically, a LAN allows the easy interconnection of modules, such as computers, monitors, terminals, printers and the like within adjacent buildings. An Ethernet is one example of a LAN in which data is broken into packets, with each packet being transmitted using a CSMA/CD algorithm until it arrives at its destination without colliding with any other packet. Thus, in operation, each node in the LAN is either transmitting or receiving data packets at any instant of operation.

Figure 1:
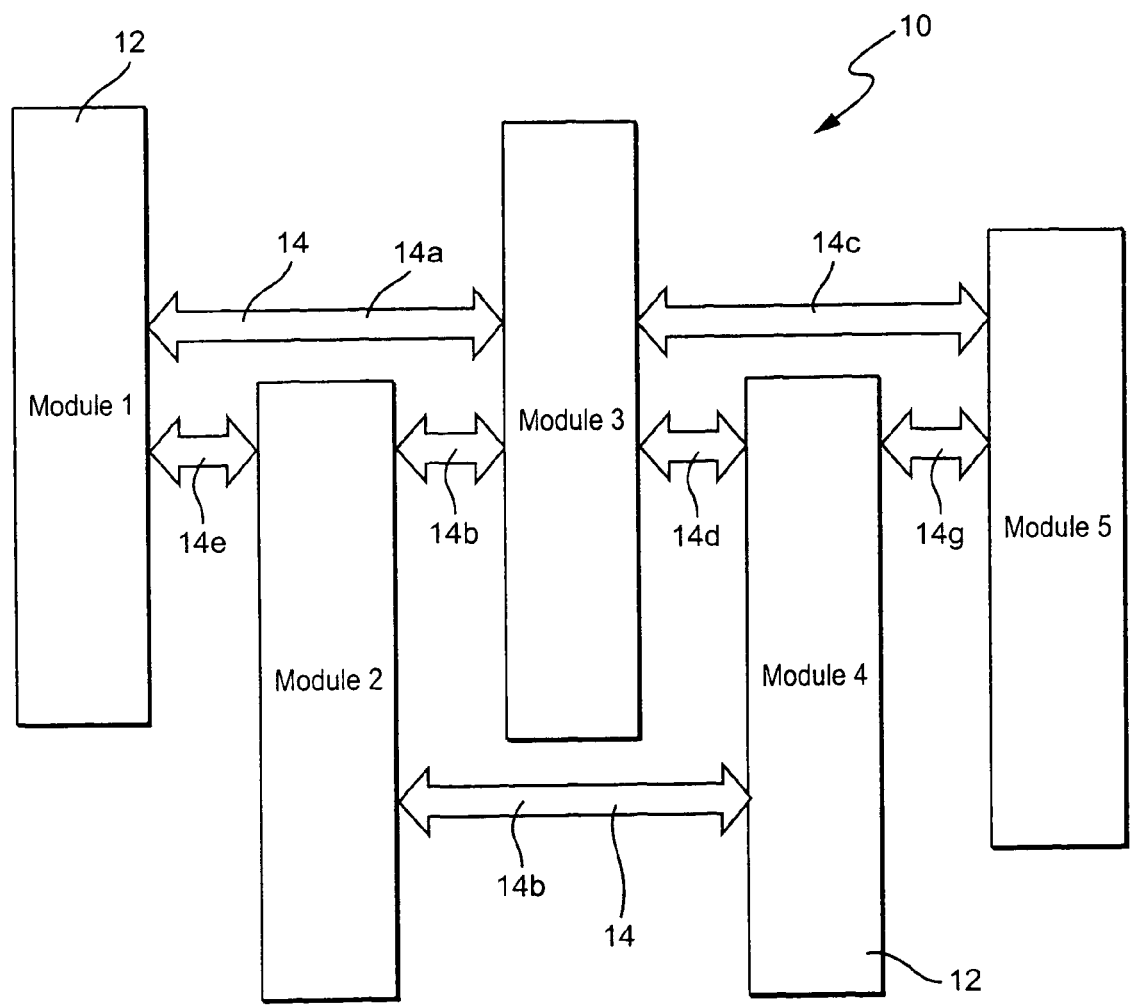
FIG. 1 is a block diagram showing the chaining architecture of the present invention for modules that are part of an Ethernet.

The present invention uses a daisy chained Ethernet architecture 10 shown in FIG. 1 in which a plurality of modules 12 are daisy chained together using a plurality of point-to-point links 14 extending between modules 12. By way of example, module 12 can be a monitoring device for rotating machines, a control device for rotating machines, and/or a data acquisition device for rotating machines. Module 12 can also be, by way of further example, a computer, a monitor and/or a terminal. In the daisy chained Ethernet architecture 10 shown in FIG. 1, each module 12 is linked to each of the two modules preceding it in the Ethernet and to each of the two modules following it in the Ethernet.

Referring to FIG. 1, there is shown an Ethernet in which five modules 12, numbered 1 through 5, are linked together using the daisy chained Ethernet architecture 10 of the present invention. In the daisy chained Ethernet architecture of the present invention, module 3, for example, is daisy chain linked to modules 1 and 5 and modules 2 and 4 by a plurality of point-to-point links 14, which are typically Ethernet cables, but alternatively may be a backplane Ethernet. Modules 1 and 2 precede module 3 in the Ethernet daisy chain, while modules 4 and 5 succeed module 3 in the Ethernet daisy chain. In this arrangement, module 3 is connected to preceding module 1 through a first link 14a, and to preceding module 2 through a second link 14b. Similarly, module 3 is connected to following module 5 through a third link 14c, and to following module 4 through a fourth link 14d.

Similar connecting arrangements are used to connect modules 1, 2, 4 and 5 to the other modules included in the Ethernet daisy chain 10 shown specifically in FIG. 1. Thus, for example, where only a single module, i.e., module 1, precedes module 2 in the Ethernet, while two modules, i.e., modules 3 and 4, succeed module 2 in the Ethernet, module 2 is connected to module 1 through a fifth link 14e, to module 3 through second link 14b, and to module 4 through a sixth 14f. Likewise, where no module precedes or succeeds a module, e.g., modules 1 and 5, in the Ethernet, such module will be connected only to the two modules that either precede or succeed it in the Ethernet. Thus, for example, module 1 is connected only to module 2 through first link 14a, and to module 3 through second link 14b.

In the daisy chain Ethernet arrangement of the present invention, any one of the modules 12 may be removed without breaking the communication path between the other modules. Thus, for example, if module 3 is removed from the Ethernet, module 5 will still be able to communicate with module 1 via modules 4 and 2 and the links 14g connecting module 5 and module 4, 14f connecting modules 4 and 2, and link 14e connecting modules 2 and 1.

It is clear from the preceding discussion that the daisy chain Ethernet 10 shown in FIG. 1 can be scaled from just a few modules 12, such as the module 1 to 5 shown in FIG. 1, to a large number of modules 12, as required. Where the daisy chain Ethernet 10 is expanded, the architecture of the daisy chain Ethernet 10 will, nevertheless, include point-to-point connections between each additional module and the two modules in the chain preceding the module and the two modules in the chain following such module.

Figure 2:
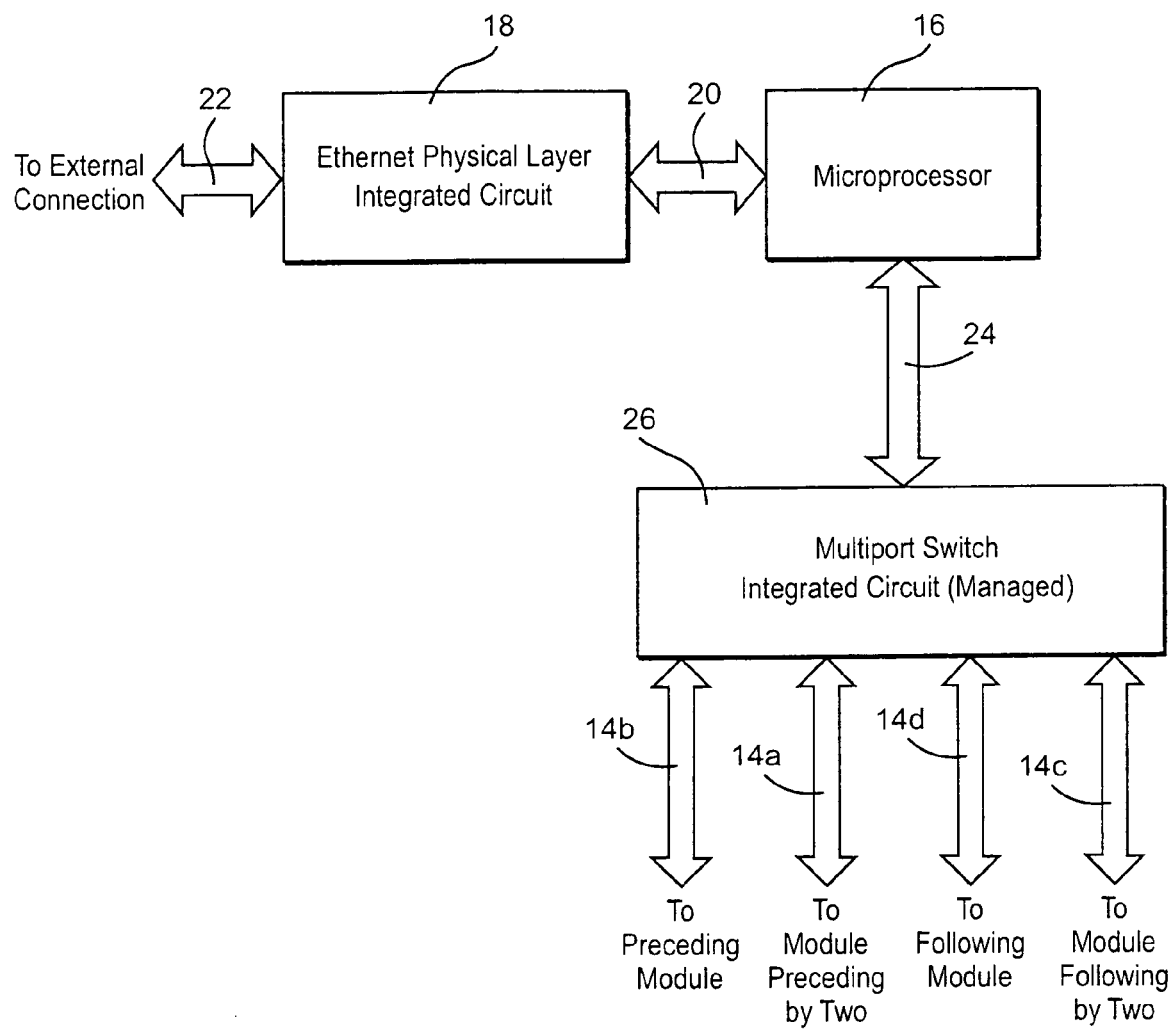
FIG. 2 is a block diagram showing the internal electrical components of each module used in the chaining architecture of the present invention shown in FIG. 1.

Referring now to FIG. 2, each module 12 also includes a controller 16, which is preferably a microprocessor, and an Ethernet IC 18, connected through a bus 20 to microprocessor 16, for connection to external devices outside the chain, such as a control system or HMI, through an Ethernet link 22 connected to Ethernet IC 18. While controller 16 is preferably a microprocessor, it could also be a network processor, a field programmable gate array ("FPGA"), a digital signal processor, an Ethernet router or additional switch chips. Microprocessor 16 provides a gateway, filtering off internal rack messages or changing between internal and external protocols. Also connected to microprocessor 16 through another bus 24 is a multi-port switch integrated circuit 26, which controls the receipt and transmission of data packets from one module to another. Thus, in the example of module 3, multiport switch 26 would be connected to point-to-point links 14a to 14d to transfer data packets through module 3 from modules 1 and/or 2 to modules 4 and/or 5, and vice versa. To prevent data looping through the redundant Ethernet networks, the switch chip utilizes IEEE 802.1d Spanning Tree Protocol, or an equivalent.

While the invention has been described in connection with what is presently considered to be the most practical and preferred embodiment, it is to be understood that the invention is not to be limited to the disclosed embodiment, but on the contrary, is intended to cover various modifications, other point-to-point serial communication methods, and equivalent arrangements included within the spirit and scope of the appended claims.

What is claimed is:

1. A local area network comprising:
a plurality of modules interconnected by a plurality of point-to-point links to form a first daisy chain, in which all of the modules are interconnected, and second and third daisy chains, in each of which less than all of the plurality of modules are interconnected so that each of the second and third daisy chains is partially redundant to the first daisy chain,
each of the plurality of modules including a multi-port switch capable of connecting the module, through first and second ports, to two of the plurality of modules preceding the module in the network, and, through third and fourth ports, to two of the plurality of modules following the module in the network,
the plurality of modules comprising: a first end module, a second end module and a plurality of modules intermediate the first and second end modules,
the first end module being connected to two intermediate modules following the first end module in the network by two point-to-point links extending directly between a port of the multi-port switch of the first end module and a port of each of the respective multi-port switches of the two following intermediate modules,
the second end module being connected to two intermediate modules preceding the second end module in the network by two point-to-point links extending directly between a port of the multi-port switch of the second end module and a port of each of the respective multi-port switches of the two preceding intermediate modules,
each of the plurality of intermediate modules being connected (a) to two modules preceding and at least one module following the module in the network by at least three point-to-point links extending respectively between at least three ports of the multi-port switch of the intermediate module and a port of each of the respective multi-port switches of the two preceding and at least one following modules, and/or (b) to two modules following and at least one module preceding the intermediate module in the network by at least three point-to-point links extending respectively between at least three ports of the multi-port switch of the intermediate module and a port of each of the respective multi-port switches of the two following and at least one preceding modules,
whereby the first and second or third daisy chains of modules can be extended and/or each of the plurality of modules can fail and/or be removed, one at a time, from the network and replaced without affecting the operation of the network.

2. The local area network of claim 1, wherein the each module includes a multi-port switch for selectively receiving data from one of the two modules preceding said module and/or for selectively transmitting data to one of the two modules following said module.

3. The local area network of claim 1, further comprising at least one additional module, the at least one additional module including a multi-port switch and being connected to the two modules in the network preceding the at least one additional module by two point-to-point links extending directly between two ports of the multi-port switch of the additional module and a port of each of the respective multi-port switches of the two preceding modules, and/or to the two modules in the network following the at least one additional module by two additional point-to-point links extending directly between two additional ports of the multi-port switch of the additional module and a port of each of the respective multi-port switches of the two following modules.

4. The local area network of claim 1, wherein the each module is a device selected from a group consisting of a monitoring device for rotating machines, a control device for rotating machines, and a data acquisition device for rotating machines.

5. The local area network of claim 1, wherein the each module is a device selected from a group consisting of a computer, a monitor and a terminal.

6. The local area network of claim 1, wherein the each module includes a controller and a link for connection to external devices outside of the network.

7. The local area network of claim 6, wherein the controller is a device selected from a group consisting of a microprocessor, a network processor, a field programmable gate array ("FPGA"), a digital signal processor, an Ethernet router and additional switch chips.

8. An Ethernet comprising:
  a plurality of modules connected together to form a first daisy chain, in which all of the modules are interconnected, and second and third daisy chains, in each of which less than all of the plurality of modules are interconnected so that each of the second and third daisy chains is partially redundant to the first daisy chain,
  each of the plurality of modules having at least two modules of the plurality of modules preceding said module in the Ethernet and/or at least two modules of the plurality of modules following the module in the Ethernet,
  each of the plurality of modules including a multi-port switch capable of connecting the module, through first and second ports, to two of the plurality of modules preceding the module in the network, and, through third and fourth ports, to two of the plurality of modules following the module in the network,
  the plurality of modules comprising: a first end module, a second end module and a plurality of modules intermediate the first and second end modules,
  the first end module being connected to two intermediate modules following the first end module in the network by two point-to-point links extending directly between a port of the multi-port switch of the first end module and a port of each of the respective multi-port switches of the two following intermediate modules,
  the second end module being connected to two intermediate modules preceding the second end module in the network by two point-to-point links extending directly between a port of the multi-port switch of the second end module and a port of each of the respective multi-port switches of the two preceding intermediate modules,
  each of the plurality of intermediate modules being connected (a) to two modules preceding and at least one module following the intermediate module in the Ethernet by at least three point-to-point links extending respectively between at least three ports of the multi-port switch of the intermediate module and a port of each of the respective multi-port switches of the two preceding and at least one following intermediate modules, and/or (b) to the two modules following and at least one module preceding the intermediate module in the Ethernet by at least three point-to-point links extending respectively between at least three ports of the multi-port switch of the intermediate module and a port of each of the respective multi-port switches of the two following and at least one preceding intermediate modules,
  whereby the first and second or third daisy chains of modules can be extended and/or each of the plurality of modules can fail and/or be removed, one at a time, from the Ethernet and replaced without affecting the operation of the Ethernet.

9. The Ethernet of claim 8, wherein the each module includes a multi-port switch for selectively linking the each module to one of the two modules preceding said module in the Ethernet and/or for selectively linking the each module to one of the two modules following said module in the Ethernet.

10. The Ethernet of claim 8, further comprising at least one additional module, the at least one additional module including a multi-port switch and being connected to the two modules in the network preceding the at least one additional module by two point-to-point links extending directly between two ports of the multi-port switch of the additional module and a port of each of the respective multi-port switches of the two preceding modules, and/or to the two modules in the Ethernet following the at least one additional module by two additional point-to-point links extending directly between two additional ports of the multi-port switch of the additional module and a port of each of the respective multi-port switches of the two following modules.

11. The Ethernet of claim 8, wherein the each module is a device selected from a group consisting of a monitoring device for rotating machines, a control device for rotating machines, and a data acquisition device for rotating machines.

12. The Ethernet of claim 8, wherein the each module is a device selected from a group consisting of a computer, a monitor and a terminal.

13. The Ethernet of claim 8, wherein the each module includes a controller and a link for connection to external devices outside of the Ethernet.

14. The Ethernet of claim 13, wherein the controller is a device selected from a group consisting of a microprocessor, a network processor, a field programmable gate array ("FPGA"), a digital signal processor, an Ethernet router and additional switch chips.

15. A method of interconnecting modules to form a local area network comprising a plurality of modules and a plurality of point-to-point links extending between the plurality of modules so as to interconnect the modules to form a first daisy chain, in which all of the modules are interconnected, and second and third daisy chains, in each of which less than all of the plurality of modules are interconnected so that each of the second and third daisy chains is partially redundant to the first daisy chain, the plurality of modules comprising: a first end module, a second end module and a plurality of modules intermediate the first and second end modules, the method comprising the steps of:
  connecting the first end module to two intermediate modules following the first end module in the network by two point-to-point links extending directly between a port of the multi-port switch of the first end module and a port of each of the respective multi-port switches of the two following intermediate modules, connecting the second end module to two intermediate modules preceding the second end module in the network by two point-to-point links extending directly between a port of the multi-port switch of the second end module and a port of each of the respective multi-port switches of the two preceding intermediate modules, connecting each of the plurality of intermediate modules to two modules preceding and at least one module following the module in the daisy chain network by at least three point-to-point links extending respectively between at least three ports of the multi-port switch of the intermediate module and a port of each of the respective multi-port switches of the two preceding and at least one following intermediate modules, and/or connecting each of the plurality of intermediate modules to the two modules following and at least one module preceding the module in the daisy chain network by at least three point-to-point links extending respectively between at least three ports of the multi-port switch of the intermediate module and a port of each of the respective multi-port switches of the two following and at least one preceding intermediate modules whereby the first and second or third daisy chains of modules can be extended and/or each of the plurality of modules can fail and/or be removed, one at a time, from the network and replaced without affecting the operation of the network.

16. The method of claim 15 further comprising the steps of providing at least one additional module in the network, the at least one additional module including a multi-port switch, and connecting said at least one additional module to the two modules in the network preceding the at least one additional module by two point-to-point links extending directly between two ports of the multi-port switch of the additional module and a port of each of the respective multi-port switches of the two preceding modules, and/or to the two modules in the network following the at least one additional module by two additional point-to-point links extending directly between two additional ports of the multi-port switch of the additional module and a port of each of the respective multi-port switches of the two following modules.

17. The method of claim 15, wherein each module is a device selected from a group consisting of a monitoring device for rotating machines, a control device for rotating machines, and a data acquisition device for rotating machines.

18. The method of claim 15, wherein each module is a device selected from a group consisting of a computer, a monitor and a terminal.

19. The method of claim 15 further comprising the step of providing each module with a controller and a link for connection to external devices outside of the network.

20. The method of claim 19, wherein the controller is a device selected from a group consisting of a microprocessor, a network processor, a field programmable gate array ("FPGA"), a digital signal processor, an Ethernet router and additional switch chips.

* * * * *